US012676566B2

(12) United States Patent　　　　　(10) Patent No.:　US 12,676,566 B2

Shimizu　　　　　　　　　　　　　　　(45) Date of Patent:　　Jul. 7, 2026

(54) CONTROLLER CIRCUIT OF MOTOR AND CONTROL METHOD

(71) Applicant: ROHM CO., LTD., Kyoto (JP)

(72) Inventor: Tatsuro Shimizu, Kyoto (JP)

(73) Assignee: ROHM CO., LTD., Kyoto (JP)

( * ) Notice:　Subject to any disclaimer, the term of this patent is extended or adjusted under 35 U.S.C. 154(b) by 137 days.

(21) Appl. No.: 18/618,441

(22) Filed:　Mar. 27, 2024

(65) Prior Publication Data

US 2024/0333185 A1　Oct. 3, 2024

(51) Int. Cl.
　　*H02P 23/12*　　　　(2006.01)

(52) U.S. Cl.
　　CPC ..................................... *H02P 23/12* (2013.01)

(58) Field of Classification Search
　　CPC ...... H02P 23/12; H02P 29/00; H02P 21/0003; H02P 23/0004
　　See application file for complete search history.

(56)　　　　　References Cited

U.S. PATENT DOCUMENTS

| | | | | | |
|---|---|---|---|---|---|
| 5,710,500 | A | * | 1/1998 | Matsuo ................... | H02P 23/16 318/632 |
| 6,667,597 | B2 | * | 12/2003 | Fedigan .................. | H02P 21/13 318/807 |
| 7,548,035 | B2 | * | 6/2009 | Endo ....................... | H02P 21/22 318/434 |
| 10,666,180 | B2 | * | 5/2020 | Wilson ..................... | H02P 6/10 |
| 2005/0007044 | A1 | * | 1/2005 | Qiu ....................... | G05B 13/048 318/717 |
| 2009/0237014 | A1 | * | 9/2009 | Yamada .................. | H02P 21/16 318/400.23 |
| 2016/0141994 | A1 | * | 5/2016 | Takase ................... | H02P 21/22 318/135 |
| 2022/0311366 | A1 | * | 9/2022 | Sun ........................ | H02P 21/18 |

FOREIGN PATENT DOCUMENTS

JP　　　　　2021191071 A　　12/2021

* cited by examiner

*Primary Examiner* — Rina I Duda

(74) *Attorney, Agent, or Firm* — CANTOR COLBURN LLP

(57)　　　　　　ABSTRACT

The present disclosure provides a controller circuit, which is a controller circuit of a motor. The controller circuit includes: a compensator, configured to generate a manipulated amount corresponding to an error between a detected value of a control amount of the motor and a command value of the control amount; and a disturbance observer. The disturbance observer has a transfer function of a system in which the command value is an input, and the control amount is an output. The disturbance observer is configured to generate a virtual control amount by inputting the command value to the transfer function and correct the command value based on a disturbance estimated value according to a difference between the virtual control amount and the detected value of the control amount.

5 Claims, 5 Drawing Sheets

CONTROLLER CIRCUIT OF MOTOR AND CONTROL METHOD

CROSS REFERENCE TO RELATED APPLICATIONS

The present invention claims priority under 35 U.S.C. § 119 to Japanese Application No. 2023-054393, filed on Mar. 29, 2023, the entire contents of which being incorporated herein by reference.

TECHNICAL FIELD

The present disclosure relates to a controller circuit of a motor.

BACKGROUND

In motor control, feedback control using a proportional integral (PI) compensator is extensively applied. Various methods are designed as methods for setting coefficients of a compensator, and one of the method is referred to as a zero-pole cancellation method. In a control system designed by using the zero-pole cancellation method, a transfer characteristic H(s) between an input and an output is equivalent to a first-order step response and is represented by an equation below.

$$H(s) = 1/(1 + sT)$$

When disturbance is mixed in the control loop, if a gain before the disturbance is mixed in is not increased, it becomes difficult to suppress influences of the disturbance. On the other hand, from the perspective of system stability, any excessive increase in the gain is unsatisfactory.

In order to suppress influences of disturbance, sometimes a control method referred to as disturbance estimation is used. In disturbance estimation, disturbance is estimated by using an observer (an estimator) and feedback is performed, thereby canceling the disturbance and hence suppressing influences of the disturbance upon the system.

PRIOR ART DOCUMENT

Patent Publication

[Patent document 1] Japan Patent Publication No. 2021-191071

DETAILED DESCRIPTION OF THE EMBODIMENTS

Summary of Embodiments

Figure 1:
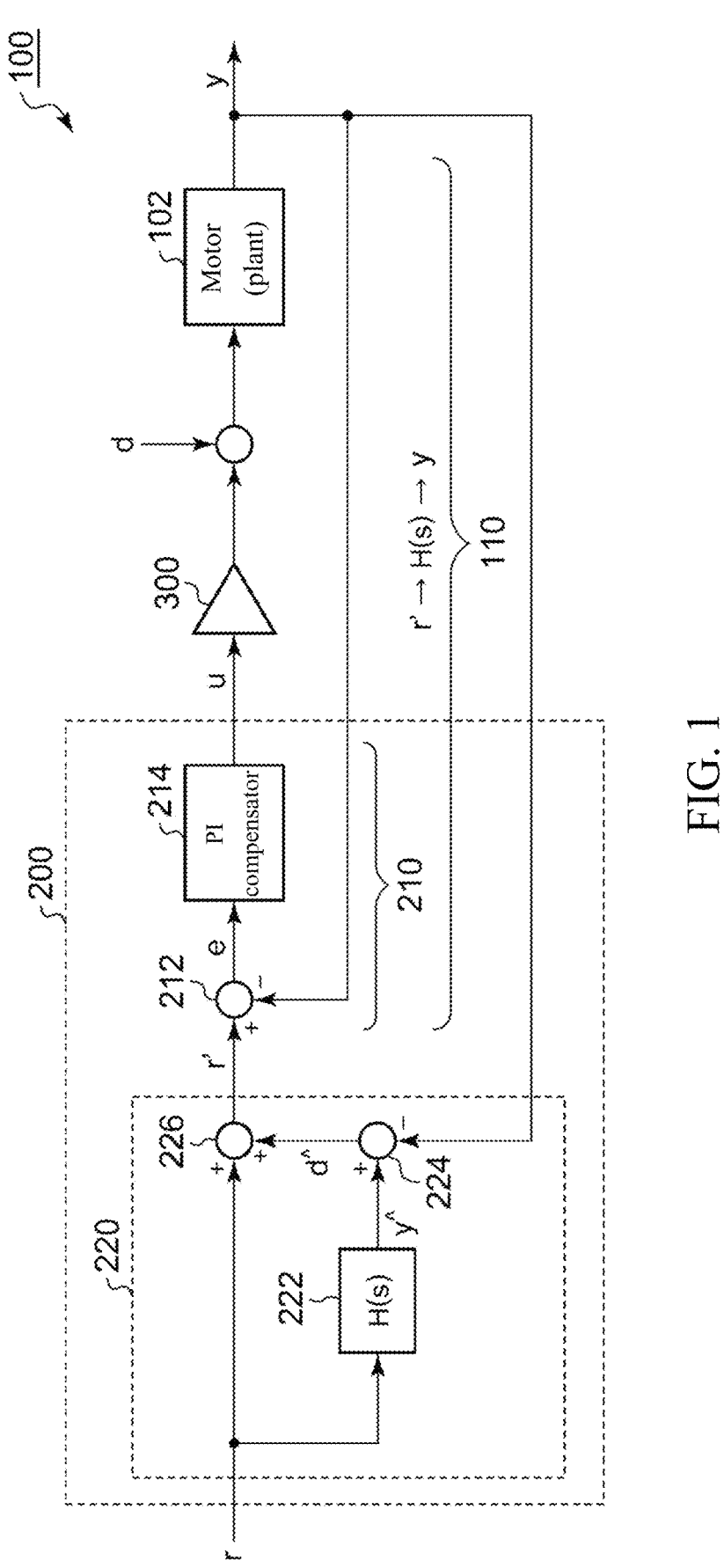
FIG. 1 is a block diagram of a motor driver system having a controller circuit according to an embodiment.

A summary of several exemplary embodiments of the present disclosure is given below. The summary serves as the introduction of the detailed description to be given below and aims to provide fundamental understanding of the embodiments by describing several concepts of one or more embodiments in brief. It should be noted that the summary is not to be construed as limitations to the scope of the application or disclosure. The summary is not a general summary of all conceivable embodiments, nor does it intend to specify important elements of all embodiments or to define the scope of a part of or all aspects. For the sake of better description, "one embodiment" sometimes refers to one embodiment (implementation example or variation example) or multiple embodiments (implementation examples or variation examples).

A controller circuit according to one embodiment, which is a controller circuit of a motor, includes: a compensator, configured to generate a manipulated amount corresponding to an error between a detected value of a control amount of the motor and a command value of the control amount; and a disturbance observer, having a transfer function of a system in which the command value is an input and the control amount is an output, configured to generate a virtual control amount by inputting the command value to the transfer function, and configured to correct the command value based on a disturbance estimated value according to a difference between the virtual control amount and the detected value of the control amount.

According to the configuration above, an expected control amount response to the command value r is estimated by a filter 222 having the same transfer function H(s) as the system, and a difference between the expected control amount response yˆ and an actual response y is used as an accident, that is, disturbance. By correcting the command value r using the disturbance obtained by the method above, influences of the disturbance d can be suppressed.

In one embodiment, the control amount can be a current flowing through a coil of the motor.

In one embodiment, the control amount can be a rotational speed of the motor.

A controller circuit according to an embodiment includes: a major controller, configured to control a minor loop using a current flowing through the motor as a control amount; and a minor controller, configured to control a major loop using a rotational speed of the motor as a control amount. At least one of the major controller and the minor controller includes: a compensator, configured to generate a manipulated amount corresponding to an error between a detected value of a control amount of the motor and a command value of the control amount; and a disturbance observer, having a transfer function of a system in which the command value is an input and the control amount is an output, configured to generate a virtual control amount by inputting the command value to the transfer function, and configured to correct the command value based on a disturbance estimated value according to a difference between the virtual control amount and the detected value of the control amount.

EMBODIMENTS

Details of the preferred embodiments are given with the accompanying drawings below. The same or equivalent constituting elements, parts and processes are represented by the same denotations, and repeated description is omitted as appropriate. Moreover, the embodiments are exemplary and are non-limiting to the present disclosure. All features and feature combinations described in the embodiments are not necessarily intrinsic features or feature combinations of the present disclosure.

FIG. 1 shows a block diagram of a motor driver system 100 having a controller circuit 200 according to an embodiment. The motor driver system 100 includes a motor 102, a controller circuit 200 and a driver circuit 300.

The motor 102 is, for example, a three-phase or single-phase direct-current (DC) brushless motor.

The controller circuit 200, by rotating the motor 102 in a target state, performs feedback control on an electrical signal (power, voltage or current) supplied to the motor 102. In the motor driver system 100, a control amount (an output of the system) y is not specifically defined and can be a current (torque control) flowing through a coil of the motor 102 or can be a rotational speed (rotational speed control) of a rotor of the motor 102. When the motor 102 is a linear motor, the control amount y can also be a position of a mover.

The controller circuit 200 generates a manipulated amount u corresponding to an error e between a detected value of the control amount y and a command value r of the control amount y. The controller circuit 200 can be installed by a combination of a microcontroller (a processor) and a software program or can be installed using a hardware logic such as a field programmable gate array (FPGA), or can further be installed in a form of an application-specific integrated circuit (ASIC).

The driver circuit 300 supplies an electrical signal corresponding to the manipulated amount u to the motor 102. That is to say, when the manipulated amount u is a voltage command, the driver circuit 300 supplies a driving voltage based on the manipulated amount u to the motor 102. When the manipulated amount u is a current command, the driver circuit 300 supplies a driving current based on the manipulated amount u to the motor 102.

The controller circuit 200 and the driver circuit 300 can be separate integrated circuits (ICs) or can be an IC integrated on the same semiconductor substrate.

The controller circuit 200 includes a feedback circuit 210 and a disturbance observer 220. The feedback circuit 210 includes an error detector 212 and a proportional integral (PI) compensator 214. The error detector 212 is a subtractor and calculates an error e between a command value r' corrected by the disturbance observer 220 and a detected control amount y (a feedback amount). The PI compensator 214 receives the error e and generates the manipulated amount u. When a proportional gain is set to Kp and an integral gain is set to Ki, the manipulated amount u is expressed by an equation below.

$$u = (Kp + Ki/s) \cdot e$$

As an example, the parameters Kp and Ki of the PI compensator 214 can be specified using the zero-pole cancellation method, so that a transfer function H(s) of the system 110 has a first-order step response.

The disturbance observer 220 is described below.

The disturbance observer 220 has a transfer characteristic H(s) the same as the transfer function H(s) of the system 110 in which the command value r' is an input and the control amount y is an output. The disturbance observer 220 generates a virtual control amount ŷ by inputting the command value r to the transfer function H(s). The disturbance observer 220 calculates a disturbance estimated value d̂ according to a difference between the virtual control amount ŷ and the detected value of the control amount y. Then, the disturbance observer 220 corrects the command value r based on the disturbance estimated value d̂ and inputs the corrected command value r' to the feedback circuit 210.

The disturbance observer 220 includes a filter 222, a disturbance calculation unit 224 and a correction unit 226. The filter 222 has a transfer characteristic H(s) the same as that of the system 110 and calculates the virtual control amount ŷ by inputting the command value r to the transfer function H(s). The disturbance calculation unit 224 generates the disturbance estimated value d̂ corresponding to the difference between the virtual control amount ŷ and the detected value of the control amount y. The correction unit 226 generates the corrected command value r̂ by adding the command value r and the disturbance estimated value d̂ (or subtracting one from the other).

The configuration of the controller circuit 200 is as described above.

In the motor driver system 100, the system 110 expects the command value r to have a first-order step. By estimating an expected control amount response to the command value r by the filter 222 having the same transfer function H(s) as the system 110, a difference between the expected control amount response ŷ and an actual response y is used as an accident, that is, disturbance. By correcting the command value r using the disturbance obtained by the method above, influences of the disturbance d can be suppressed.

The following advantages are provided. That is, only the disturbance observer 220 needs to be added to the conventional controller circuit 200 including the feedback circuit 210 and the driver circuit 300, and no improvement needs to be made on the feedback circuit 210 serving as a basic control system or the driver circuit 300.

Moreover, the controller circuit 200 of this embodiment uses the difference between the actual characteristic of the overall system including the PI compensator 214 and the expected characteristic of the system as the disturbance. Thus, compared to disturbance estimation without involving the PI compensator 214, an advantage of being minimally affected by influences of errors of parameters is achieved.

Various devices and methods of the present disclosure related to the block diagram of FIG. 1 or handling of circuit diagrams or derived from the description above are not limited to being the specified configurations. More specific configuration examples or embodiments are to be described below to help better and more clearly understand the essentials or operations of the disclosure and to make these essentials or operations clearer, rather than restraining a scope of the disclosure.

First Embodiment

Figure 2:
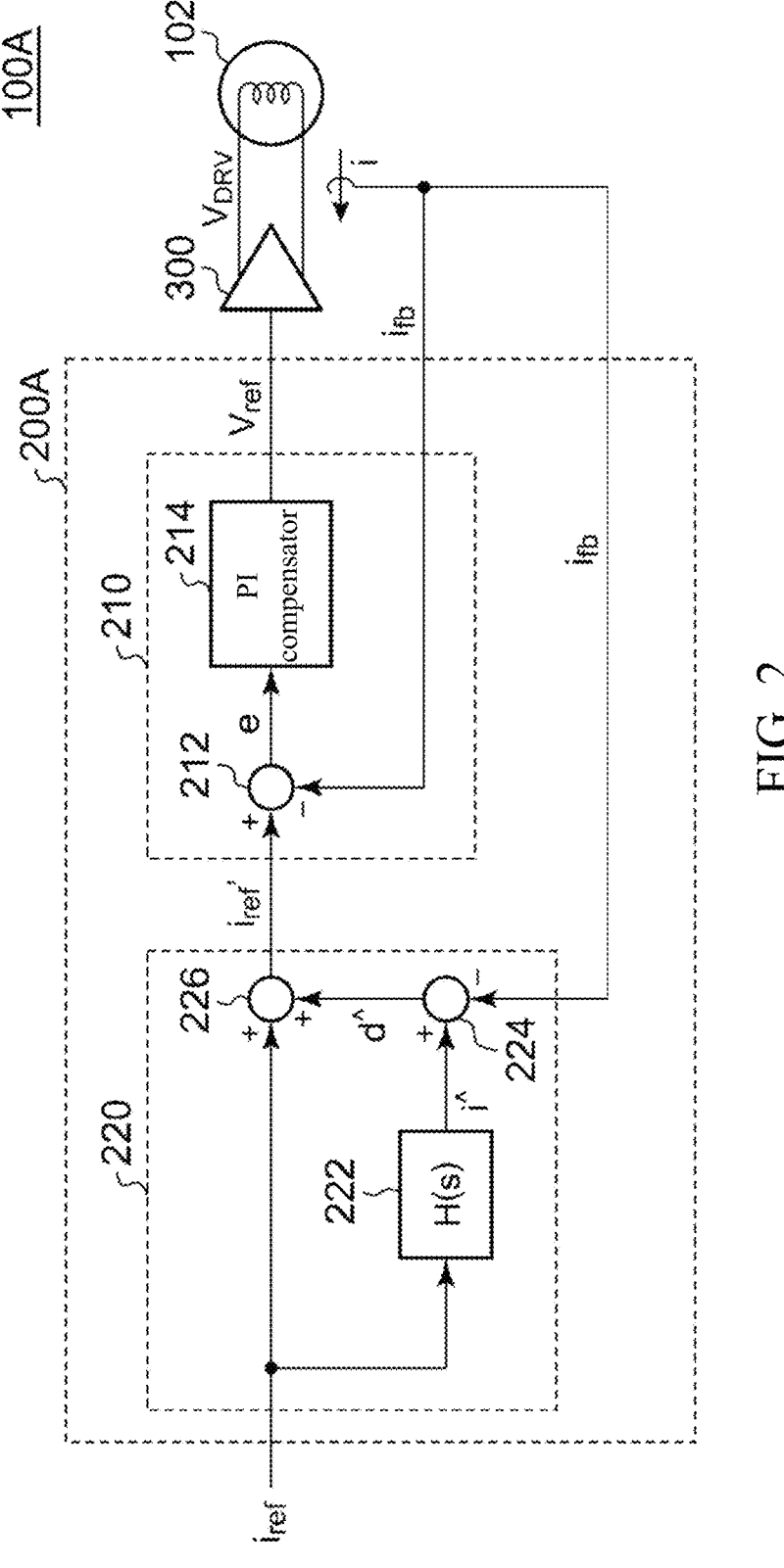
FIG. 2 is a block diagram of a motor driver system according to a first embodiment.

FIG. 2 shows a block diagram of a motor driver system 100A according to the first embodiment. In this embodiment, the motor driver system 100A uses a current (a coil current) i flowing through the coil of the motor 102 as a control amount.

The controller circuit 200 generates a voltage command $V_{ref}$ that is to be applied to a driving voltage $V_{drv}$ of the motor 102, in a manner that an error between a command value $i_{ref}$ of the coil current i and a detected value $i_{fb}$ of the coil current approximates 0.

The driver circuit 300 applies the driving voltage $V_{drv}$ proportional to the voltage command $V_{ref}$ to the motor 102. A driving method of the driver circuit 300 is not specifically defined. In a pulse width modulation (PWM) driving method, a driver circuit 300A can also include a pulse width modulator and an inverter. In this case, a duty cycle of a pulse signal generated by the pulse width modulator is adjusted according to the voltage command $V_{ref}$.

In a linear method, the driver circuit 300A can include a linear amplifier that amplifies the voltage command $V_{ref}$ and generates the driving voltage $V_{drv}$.

The configuration of a controller circuit 200A is the same as the configuration described with reference to FIG. 1, and such details are omitted herein.

Figure 3:
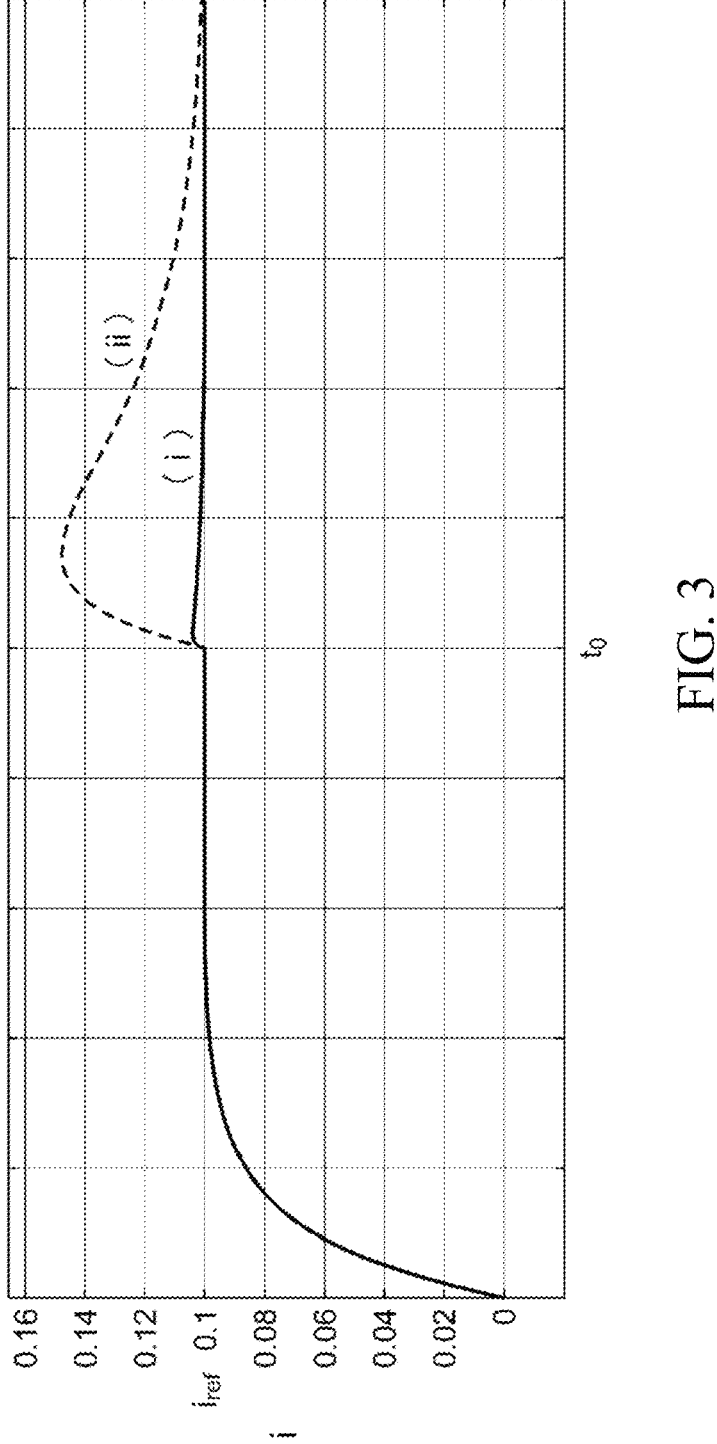
FIG. 3 is a waveform diagram of the operation of the motor driver circuit in FIG. 2.

FIG. 3 shows a waveform diagram of the operation (simulation results) of the motor driver circuit 100A in FIG. 2. The waveform (i) is a waveform of the coil current i in the motor driver system 100A, and the wave (ii) is a waveform of the coil current i in the comparison technique. The comparison technique is equivalent to a circuit from which the disturbance observer 220 is omitted.

During the simulation process, a response when a step disturbance d is input at a timing to is calculated. In the comparison technique, the disturbance causes a significant increase in the coil current i, and the time needed to converge to a target current $i_{ref}$ is longer. In contrast, in the embodiment, the magnitude of an increase in the coil current i can be suppressed, so the time needed to converge to the target current $i_{ref}$ can be significantly reduced.

Second Embodiment

Figure 4:
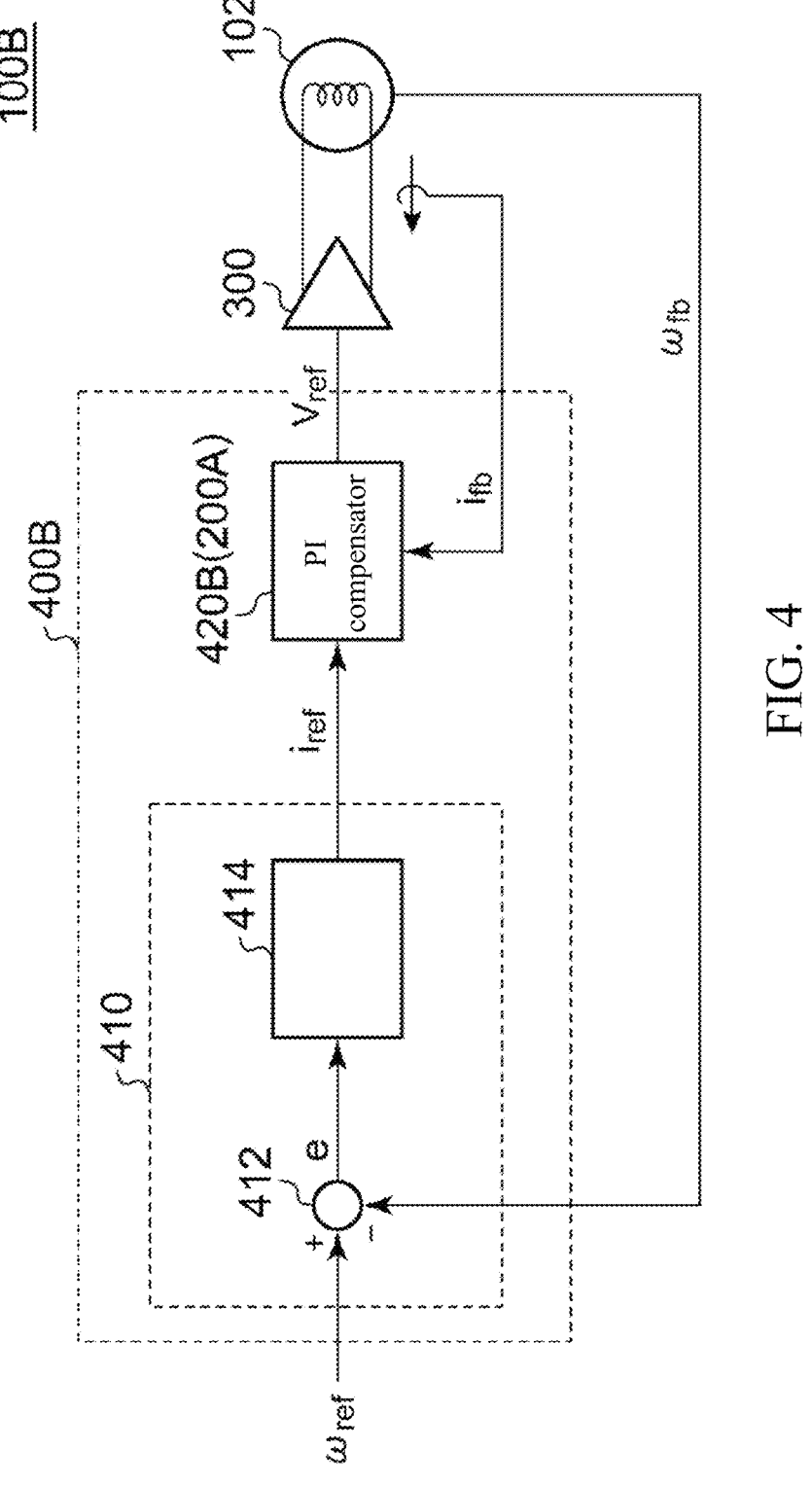
FIG. 4 is a block diagram of a motor driver system according to a second embodiment.

FIG. 4 shows a block diagram of a motor driver system 100B of the second embodiment. The motor driver system 100B includes a motor 102, a driver circuit 300 and a controller circuit 400B. The controller circuit 400B includes a major controller 410 and a minor controller 420B.

The major controller 410 uses a rotational speed ω of the motor 102 as a control amount to perform feedback control. The major controller 410 receives a command value $\omega_{ref}$ of the rotational speed ω and a detected value $\omega_{fb}$ of the rotational speed ω and generates a current command $i_{ref}$ (a torque command) in a manner that an error e between the two approximates 0. The major controller 410 can include an error detector 412 and a PI compensator 414. In speed control, there are cases where a proportional integral derivative (PID) compensator is used in substitution for the PI compensator 414.

The minor controller 420B uses the coil current i of the motor 102 as a control amount to perform feedback control. The minor controller 420B generates a voltage command $V_{ref}$ in a manner that an error between the command value $i_{ref}$ of the coil current i and the detected value in of the coil current i approximates 0. The minor controller 420B has a same configuration as the controller circuit 200A described in the first embodiment and includes the disturbance observer 220.

Third Embodiment

Figure 5:
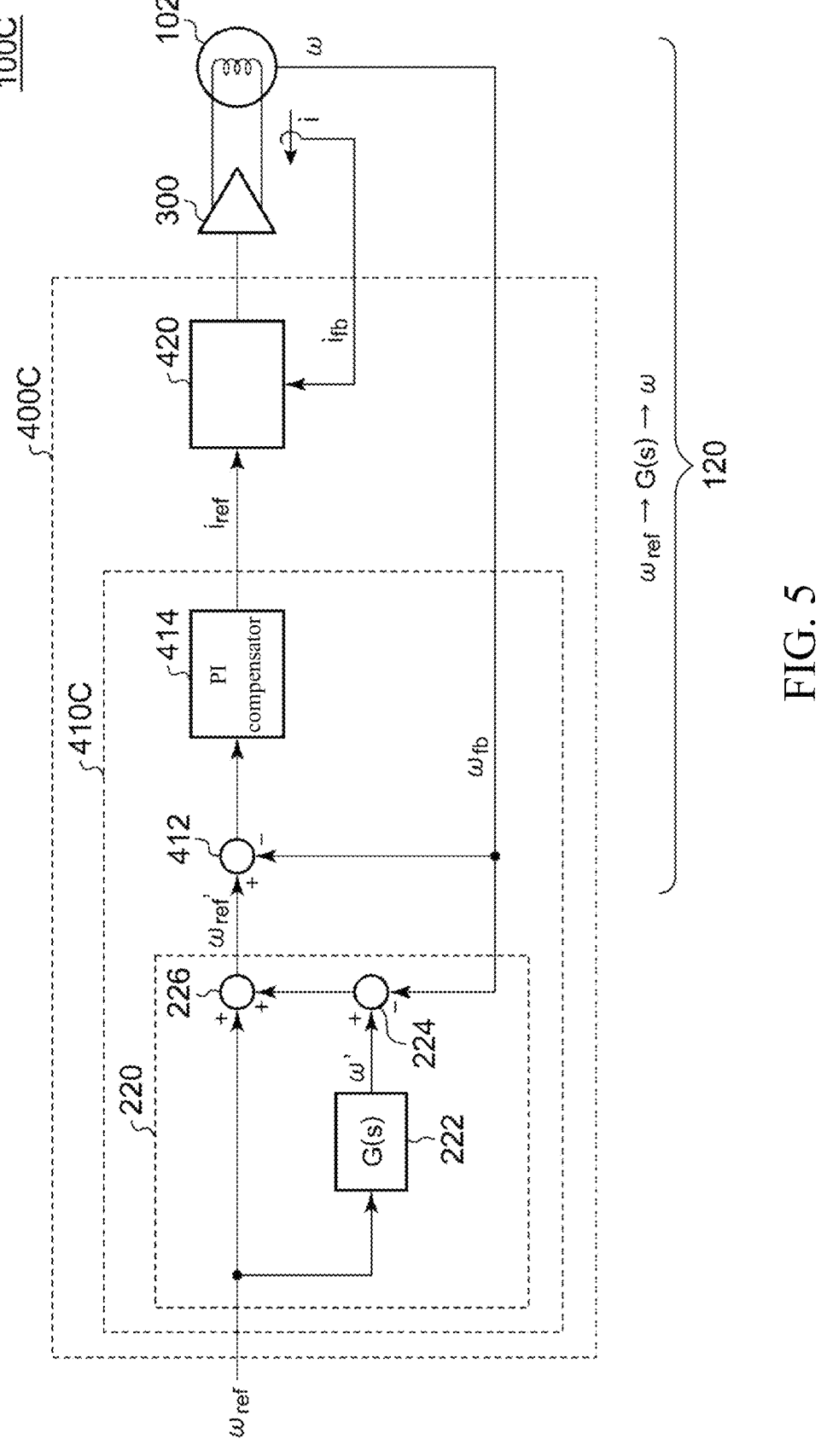
FIG. 5 is a circuit diagram of a motor driver system according to a third embodiment.

FIG. 5 shows a circuit diagram of a motor driver system 100C according to a third embodiment. Similar to the second embodiment, a controller circuit 400C of the motor driver system 100C includes a major controller 410C and a minor controller 420.

In the third embodiment, the disturbance observer 220 is assembled in the controller circuit 200 in FIG. 1 in the major controller 410C. The filter 222 of the disturbance observer 220 has a transfer function G(s) of the system 120 in which a corrected command value $\omega_{ref}$ of the rotational speed ω is an input and the rotational speed ω is an output.

The embodiments are exemplary, and it should be understood that various modifications may be made to combinations of the constituting elements and processes, and such modifications are to be encompassed within the scope of the disclosure. Details of such variation examples are given in the description below.

The configuration of the disturbance observer 220 shown in FIG. 1 is merely an example, and the order of the calculation, addition or subtraction can be modified.

The embodiments are exemplary, and it should be understood that various modifications may be made to combinations of the constituting elements and processes, and such modifications are to be encompassed within the scope of the disclosure.

Note

One aspect of the technology disclosed in the specification can be understood as follows.

(Item 1)

A controller circuit, which is a controller circuit of a motor, comprising:

a compensator, configured to generate a manipulated amount corresponding to an error between a detected value of a control amount of the motor and a command value of the control amount; and a disturbance observer, having a transfer function of a system in which the command value is an input and the control amount is an output, configured to generate a virtual control amount by inputting the command value to the transfer function, and configured to correct the command value based on a disturbance estimated value according to a difference between the virtual control amount and the detected value of the control amount.

(Item 2)

The controller circuit of Item 1, wherein the control amount is a current flowing through a coil of the motor.

(Item 3)

The controller circuit of Item 1, wherein the control amount is a rotational speed of the motor.

(Item 4)

A controller circuit, which is a controller circuit of a motor, comprising:

a major controller, configured to control a minor loop using a current flowing through the motor as a control amount; and a minor controller, configured to control a major loop using a rotational speed of the motor as a control amount, wherein at least one of the major controller and the minor controller includes:

a compensator, configured to generate a manipulated amount corresponding to an error between a detected value of a control amount of the motor and a command value of the control amount; and a disturbance observer, having a transfer function of a system in which the command value is an input and the control amount is an output, configured to generate a virtual control amount by
inputting the command value to the transfer func-
tion, and configured to correct the command value based on a
disturbance estimated value according to a differ-
ence between the virtual control amount and the
detected value of the control amount.

(Item 5)

A control method, which is a control method of a motor,
comprising:

generating a manipulated amount corresponding to an
error between a detected value of a control amount of
the motor and a command value of the control amount;

generating a virtual control amount by inputting the
command value to a filter having a transfer function of
a system in which the command value is an input and
the control amount is an output; and correcting the command value based on a disturbance
estimated value according to a difference between the
virtual control amount and the detected value of the
control amount.

The invention claimed is:

1. A controller circuit, which is a controller circuit of a
motor, comprising:

a compensator, configured to generate a manipulated
amount corresponding to an error between a detected
value of a control amount of the motor and a corrected
command value of the control amount; and a disturbance observer, having a transfer function of a system in which a
command value of the control amount is an input,
and the control amount is an output, configured to generate a virtual control amount by
inputting the command value to the transfer function,
and configured to correct the command value so as to
generate the corrected command value based on a
disturbance estimated value according to a difference
between the virtual control amount and the detected
value of the control amount.

2. The controller circuit of claim 1, wherein the control
amount is a current flowing through a coil of the motor.

3. The controller circuit of claim 1, wherein the control
amount is a rotational speed of the motor.

4. A controller circuit, which is a controller circuit of a
motor, comprising:

a major controller, configured to control a minor loop
using a current flowing through the motor as a control
amount; and a minor controller, configured to control a major loop
using a rotational speed of the motor as a control
amount, wherein at least one of the major controller and the minor con-
troller includes:

a compensator, configured to generate a manipulated
amount corresponding to an error between a detected
value of a control amount of the motor and a cor-
rected command value of the control amount; and a disturbance observer, having a transfer function of a system in which a
command value of the control amount is an input
and the control amount is an output, configured to generate a virtual control amount by
inputting the command value to the transfer func-
tion, and configured to correct the command value so as to
generate the corrected command based on a dis-
turbance estimated value according to a difference
between the virtual control amount and the
detected value of the control amount.

5. A control method, which is a control method of a motor,
comprising:

generating a manipulated amount corresponding to an
error between a detected value of a control amount of
the motor and a corrected command value of the
control amount;

generating a virtual control amount by inputting a com-
mand value of the control amount to a filter having a
transfer function of a system in which the command
value is an input, and the control amount is an output;
and correcting the command value so as to generate the
corrected command value based on a disturbance esti-
mated value according to a difference between the
virtual control amount and the detected value of the
control amount.

* * * * *